3,151,157
PROCESS FOR THE PREPARATION OF N-ALKYLACRYLAMIDES
Wesley Orlean Fugate, Old Greenwich, and Michael Joseph D'Errico, Stamford, Conn., assignors to American Cyanamid Company, Stamford, Conn., a corporation of Maine
No Drawing. Filed May 23, 1963, Ser. No. 282,553
4 Claims. (Cl. 260—561)

The present invention relates to an improved process for the preparation of N-alkylacrylamides, which materials may, among other things, be sulfonated to form sulfo-N-alkylpropionamides. These materials have demonstrated utility as detergents and other uses.

In the preparation of N-alkylacrylamides by employing the Ritter reaction, in which a suitable nitrile and a suitable olefin are reacted in the presence of a cationoid material, as, for example, strong sulfuric acid, it is frequently difficult to control the reaction temperature and extensive efforts are usually required in order to insure the control of the dangerous exotherm resulting from such a reaction.

For example, when a Ritter reaction between acrylonitrile and an olefin in the presence of sulfuric acid is carried out by adding the sulfuric acid to a stirred mixture of the olefin and acrylonitrile, the mixture is not homogeneous until the reaction is substantially complete. The heat evolution is substantial under these conditions and dissipation of the heat is difficult. If the sulfuric acid is added to the olefin-nitrile mixture at a low temperature, for example 0–10° C., and the reaction mixture is allowed to warm up to approximately 50° C., the conditions exist for a sudden and rapid hydrolysis or polymerization of unreacted acrylonitrile to occur. Under such circumstances, the reaction may become violent and extremely hazardous.

If the dangerous exotherm resulting from this reaction could be readily controlled, thereby eliminating an unsafe condition, without extending the reaction time to impractical limits, an important advance would result in the preparation of N-alkylacrylamides employing said Ritter reaction.

Accordingly, it is an object of the present invention to provide a relatively simple process improvement whereby the dangerous exotherm is readily controlled, which is normally experienced when a nitrile and an olefin are reacted in the presence of sulfuric acid.

It is a further object of this invention to provide such a process which in addition to simply and directly controlling such a dangerous exotherm does not result in any diminution of yield of the reaction product, i.e., the N-alkylacrylamides.

It is still a further object of this invention to provide such a process which, in addition to simply and directly controlling such a dangerous exotherm, does not extend the reaction time and in fact, permits the reaction to be carried out at a relatively rapid rate.

These and other objects and advantages of the present invention will become more apparent from the detailed description thereof set forth hereinbelow.

In accordance with the present invention, a process for preparing an N-alkylacrylamide is provided which comprises reacting an olefin, an α-unsaturated nitrile and strong sulfuric acid, in the presence of a "heel" formed as a result of the reaction of an olefin and an α-unsaturated nitrile in the presence of strong sulfuric acid, while maintaining the temperature at from about 20 to about 90° C. to form said N-alkylacrylamide.

The "heel," as that term is employed herein, refers to the reaction mixture of a nitrile and a suitable olefin and a suitable cationoid substance, such as strong sulfuric acid. These reactants should be employed in making up the heel in relative mole ratios of about 1:1:1 or in the relative mole ratio in which they would be employed if they were not the heel but were in fact the principal reactants in the preparation of the N-alkylacrylamide.

We have found that in operating with a heel at the higher reaction temperature, the ratio of reacted to unreacted starting materials is always extremely high and the reaction mixture is homogeneous (probably completely in solution). In this case, the temperature may be controlled adiabatically in a small reactor, or with a suitable heat exchanger in a large reactor while operating at high addition rates. Accordingly, we have eliminated the possibility that a violent hydrolysis, or polymerization of acrylonitrile or an uncontrolled Ritter reaction can occur. The reaction thus proceeds smoothly and is readily adaptable to continuous operation with a minimum of hazard.

Typically, the invention may be carried out by forming a heel by reacting a suitable olefin having at least 10 carbon atoms and an α-unsaturated nitrile in the presence of a cationoid substance such as strong sulfuric acid.

Such a reaction product or heel may be prepared in accordance with the procedure of U.S. Patent No. 2,573,673 and illustratively may be prepared by reacting relative mole ratios of one mole of suitable olefin, nitrile and strong acid at temperatures of from 20 to 90° C. and preferably at a temperature of from about 40 to about 80° C. While maintaining such a heel at a temperature of between 20 and 90° C. and preferably at a temperature of from about 40 to about 80° C., nitrile and olefin in relative mole ratios of nitrile and olefin of about 1:1 are added. At a proportional rate there is added to said heel at least an equivalent amount of sulfuric acid, though preferably an excess of from 30 to 250% is employed. This addition is rapid, being carried out in from about 15 minutes to about 45 minutes. After addition to the "heel," the reaction is carried out at a temperature of from about 40 to about 80° C. until the reaction is complete.

Normally, in the batch-type reaction the amount of heel present will be about equivalent to that which will be produced from the reactants present in a reaction mixture at any given time. With regard to the control of the exotherm, effective control is maintained when a heel constituting at least about 75% of the amount of product is produced by the reactant present in the mixture. The amount of heel will not normally exceed about 200% that produced by the reactants present in the mixture. It will be readily appreciated that to some extent the amount of heel required is directly dependent upon the rates of addition of reactants thereto.

As will be seen hereinafter, failure to cool after the initial charge of acid is added, as for example in accordance with procedures in which a heel is not employed, results in a dangerous exotherm in which the temperatures rapidly rise to above 90° C., which adversely affect the quality of the final product.

The olefins suitable for use in the present process are olefins having at least 10 and up to 40 carbon atoms. Preferably they contain from 10 to about 20 carbon atoms. These olefins are preferably further characterized as being predominantly straight chain, i.e., having a minimum of about 75% of straight chain materials. Where the N-alkylacrylamide is to be sulfonated for use as detergents, it is preferred that the olefins be long chain straight chain materials having at least 10 carbon atoms. Suitable olefins contemplated for use in this invention are available from the petroleum industry. As examples of suitable olefins, the following are illustrative: decene-1, decene-2, decene-3, decene-4, decene-5, undecene-1, undecene-2, undecene-3, undecene-4, undecene-5, dodecene-1, dodecene-2, dodecene-3, dodecene-4, dodecene-5, dodecene-6, tridecene-1, tridecene-2, tridecene-3, tridecene-4, tridecene-5, tridecene-6, tetradecene-1, tetradecene-2, tetradecene-3, tetradecene-4, tetradecene-5, tetradecene-6, tetradecene-7, pentadecene-1, pentadecene-2, pentadecene-3, pentadecene-4, pentadecene-5, pentadecene-6, pentadecene-7, hexadecene-1, hexadecene-2, hexadecene-3, hexadecene-4, hexadecene-5, hexadecene-6, hexadecene-7, hexadecene-8, octadecene-1, octadecene-2, octadecene-3, octadecene-4, octadecene-5, octadecene-6, octadecene-7, octadecene-8, octadecene-9, telomers of propylene and butylene such as propylene tetramer, propylene hexamer, triisobutylene, tetraisobutylene and the like. These and other olefins may be employed singly or in combination with one or more of each other.

The α-unsaturated nitrile should be a material which, when condensed with the olefin, is capable of bisulfite addition at its unsaturated double bond. Principally such nitriles include acrylonitrile, α-substituted acrylonitriles, such as methacrylonitrile, α-chloro acrylonitrile and β-substituted acrylonitriles, such as crotononitrile, β-chloroacrylonitrile and other equivalent materials.

The cationoid material employed in this process may be any acid agent capable of protonizing the unsaturated bond of the olefin. However, as a practical matter we have found that strong sulfuric acid is best suited. "Strong sulfuric acid," as that term is employed herein, is intended to include sulfuric acid being at least 90% and preferably 95 to 100% acid.

As will be apparent, the term N-alkylacrylamide as it is employed herein is intended to include the Ritter reaction product, which results from the reaction of suitable α-unsaturated nitriles and suitable olefins, as those terms are described herein, in the presense of a cationoid substance such as sulfuric acid.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

Example 1

Dodecene-1 and acrylonitrile (½ mole of each) were mixed with rapid stirring in a 500 cc. Morton flask until the temperature was below 10° C. Then, ½ mole of 97.5% sulfuric acid was added while the temperature was maintained below 10° C. After the addition, the cooling bath was removed and the reaction was allowed to exotherm. The temperature rose to 95° C. It was cooled to 50° C. and kept at 50–60° C. for 2 hours. The mixture was poured on 200 cc. of ice and 500 cc. of water, and then stirred at room temperature for 30 minutes. Next the mixture was cooled to 0° C. and the theoretical amount of 10% NaOH solution was added, while the temperature was maintained below 20° C. The mixture was cooled to 0° C. and a yellow solid separated. This was filtered and dried. Yield: 38.0 g.; 31.8%.

It will be seen in accordance with Example 1 that when the temperature reached 95° C. the yield and quality of the product were poor.

Example 2

0.5 mole dodecene-1 and 0.5 mole acrylonitrile were mixed in a 500 cc. Morton flask and heated with stirring to 50° C. To the hot mixture 0.5 mole concentrated $H_2SO_4$, (97.5%) were added slowly, (total time 20 minutes) keeping the temperature of the solution at 50° C. by an uneconomical amount of cooling.

After all the acid has been added, the reaction mixture was stirred for an additional 1½ hours at 50° C. Thereafter the product was worked up and recovered as in Example 1 above. Yield: 49.0 grams, 41% of N-(dodecyl)acrylamide.

Into a suitable reaction vessel 26.5 grams (½ mole) of acrylonitrile and 84 grams (½ mole) of dodecene-1 were added through two dropping funnels. The reaction mixture was cooled to from between 0 and 10° C. and ½ mole of concentrated sulfuric acid was added while maintaining the temperature below 10° C. After the addition of the acid, the reaction mixture was allowed to warm up to 50° C., becoming homogeneous.

Employing the above mixture as a heel, a mixture of 26.5 grams (½ mole) of acrylonitrile and 84 grams (½ mole) of dodecene-1 were added through one dropping funnel and ½ mole of sulfuric acid through another at proportional rates. The additions were controlled to maintain the temperature at 50° C. The ½ mole of reactants was added to the ½ mole of heel in 20 minutes with no extra cooling required. The yield was 82 grams, 34.3%.

It will thus be seen that by employing the procedure of Example 3 the potential danger or hazard of the rapid exotherm in accordance with a conventional procedure is overcome.

Example 4

To a heel prepared from acrylonitrile, dodecene-1 and concentrated sulfuric acid in the ratio 1:1:2 and brought to 50° C., the following were added at proportional rates and controlled to maintain the temperature at 50° C.

| | Mole |
|---|---|
| Acrylonitrile | 1 |
| Dodecene-1 | 1 |
| Concentrated sulfuric acid | 1 |

The addition was rapid and did not require cooling. After the addition, the reaction mixture was kept at 50° C. for 1½ hours. The yield was 77.5% after working up in the usual manner.

Example 5

A heel prepared from acrylonitrile, dodecene-1 and concentrated sulfuric acid was charged into a flask equipped with an overflow outlet. The overflow is led into a second flask also equipped with an overflow outlet. The heel was brought to 50° C. and acrylonitrile, dodecene-1 and concentrated sulfuric acid were added continuously in the mole ratio of 1:1:2 so as to maintain the temperature in the first flask at 50° C. The size of the first flask was designed to keep the reactants for a residence time of 30 minutes. The second flask was kept at 50° C. and so designed that the residence time was 1½–2 hours. The overflow from the second flask was worked up in the usual manner. The yield was 94 grams per ½ mole or 76%.

While normally the above process is carried out at atmospheric pressure, it will be readily appreciated that it may be carried out at subatmospheric pressure or superatmospheric pressure.

This application is a continuation-in-part application of our copending application Serial No. 111,464, filed May 22, 1961, now abandoned.

While this invention has been described in conjunction with various preferred embodiments, it is to be understood that the invention is not to be solely limited thereto but is to be construed broadly and restricted only by the appended claims.

We claim:
1. In a process for preparing an N-alkylacrylamide by reacting an olefin and an α-unsaturated nitrile in the presence of strong sulfuric acid, the improvement which comprises reacting said olefin, said α-unsaturated nitrile and strong sulfuric acid in a preformed reaction product of said olefin, said α-unsaturated nitrile and strong sulfuric acid while maintaining the reaction temperature at from 20 to 90° C.

2. In a process for preparing an N-alkylacrylamide by reacting a predominantly straight chain olefin containing from 10 to 20 carbon atoms and acrylonitrile in the presence of strong sulfuric acid, the improvement which comprises reacting said predominantly straight chain olefin containing from 10 to 20 carbon atoms, acrylonitrile and strong sulfuric acid in a preformed reaction product of said olefin, acrylonitrile and strong sulfuric acid while maintaining the reaction temperature at from 20 to 90° C.

3. A process according to claim 2 in which a mixture of the olefin and nitrile and the strong sulfuric acid are added separately to the preformed reaction product but at proportional rates.

4. A process according to claim 2 which is continuous.

No references cited.